United States Patent
Bender et al.

(10) Patent No.: US 11,173,828 B2
(45) Date of Patent: Nov. 16, 2021

(54) STAKE POCKET ACCESSORIES HAVING A LOCKING MECHANISM

(71) Applicants: Frederick F Bender, South Lyon, MI (US); Leland L Decker, Sterling Heights, MI (US)

(72) Inventors: Frederick F Bender, South Lyon, MI (US); Leland L Decker, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/801,772

(22) Filed: Feb. 26, 2020

(65) Prior Publication Data

US 2021/0261039 A1    Aug. 26, 2021

(51) Int. Cl.
    *B60P 7/08* (2006.01)
(52) U.S. Cl.
    CPC .................. *B60P 7/0807* (2013.01)
(58) Field of Classification Search
    CPC ........ B60P 7/0807; B60P 7/08; F16G 11/143; F16G 11/146
    USPC ......... 410/101, 102, 106, 109, 110, 112, 116
    See application file for complete search history.

(56) References Cited

U.S. PATENT DOCUMENTS

| | | | |
|---|---|---|---|
| 3,110,506 A | 11/1963 | O'Brien | |
| 3,351,356 A * | 11/1967 | Clark | B60P 7/0807 410/110 |
| 3,677,562 A | 7/1972 | Bronstein | |
| 4,396,324 A | 8/1983 | Ellis | |
| 5,560,576 A | 10/1996 | Cargill | |
| 5,688,087 A | 11/1997 | Stapleton et al. | |
| 6,464,437 B1 | 10/2002 | Elwell | |
| 6,764,259 B1 | 7/2004 | Preta | |
| 6,846,140 B2 * | 1/2005 | Anderson | B60P 7/0815 410/102 |
| 7,503,738 B1 | 3/2009 | Doyle | |
| 10,406,964 B1 * | 9/2019 | Thompson | B60P 7/0807 |
| 2005/0079026 A1 * | 4/2005 | Speece | B60P 7/0807 410/106 |
| 2015/0071727 A1 * | 3/2015 | Hemphill | B60P 7/0807 410/110 |

FOREIGN PATENT DOCUMENTS

CA     2690073 C    5/2012

* cited by examiner

*Primary Examiner* — Stephen T Gordon
(74) *Attorney, Agent, or Firm* — Ralph E. Smith

(57) ABSTRACT

An accessory configured to be secured within a stake pocket formed in a sidewall of a bed of a vehicle. The stake pocket includes an opening formed in an upper wall of the sidewall configured for receipt of the accessory, a first aperture that is not accessible from the bed, and a second aperture that is accessible from the bed. The accessory includes a locking mechanism that is configured to secure the accessory to either the first aperture or the second aperture.

10 Claims, 10 Drawing Sheets

STAKE POCKET ACCESSORIES HAVING A LOCKING MECHANISM

FIELD

The present disclosure relates to stake pocket accessories having a locking mechanism.

BACKGROUND

This section provides background information related to the present disclosure which is not necessarily prior art.

Pickup trucks are often used for hauling cargo. To prevent the cargo from shifting during travel, the cargo must frequently be tied down to anchoring devices located on the truck or in the truck bed. The anchoring devices or "tie downs" may also be used to secure tarps to cover the cargo located in the truck bed to guard against inclement weather. Most pickup trucks are manufactured to have a plurality of stake pockets spaced around the bed of the pickup, which are recesses formed in the upper wall of the bed that are configured for receipt of a "stake" or pole of a rack system, bed cover, or the like. These stake pockets may also be used for mounting the aforementioned anchoring devices. Unfortunately, many conventional anchor devices that are designed to be seated in the stake pocket must be permanently attached to the stake pocket, which can detract from the aesthetic appearance of the vehicle and prevent mounting of other devices to the truck bed such as the above-mentioned rack system, bed cover, or the like. Alternatively, if the anchoring device is removable, it can easily be stolen.

SUMMARY

This section provides a general summary of the disclosure, and is not a comprehensive disclosure of its full scope or all of its features.

According to a first aspect of the present disclosure, an accessory is provided that is configured to be secured within a stake pocket formed in a sidewall of a bed of a vehicle. The stake pocket includes an opening formed in an upper wall of the sidewall that is configured for receipt of the accessory, a first aperture that is not accessible from the bed, and a second aperture that is accessible from the bed. The accessory comprises a locking mechanism that is configured to secure the accessory to either the first aperture or the second aperture. With this configuration, the accessory is reliably secured to the stake pocket, and can only be removed when desired.

The accessory according to the first aspect of the present disclosure may include an anchor device that extends either away from the opening, or away from the second aperture toward an interior of the bed. In such a case, the anchor device may include a D-ring.

The accessory according to the first aspect of the present disclosure may include a casing that houses a movable locking lever of the locking mechanism, wherein the movable locking lever is movable between a locked and an unlocked position, and in the locked position the lever is configured to engage the first aperture that is not accessible from the bed. In such a case, the movable locking lever may be moved by rotation of a locking cylinder located within the casing, or may be moved by rotation of a rod that is fixed to a depressible and rotatable button that is attached to the casing.

Alternatively, the locking mechanism may secure the accessory to the second aperture of the stake pocket. In such a case, the locking mechanism may include a lock plate bezel that is configured to be received within the second aperture, and a rotatable lock latch having a pair of locking flanges that are configured to engage and secure the accessory to an interior of the stake pocket. The rotatable lock latch may include a recess that is configured to be engaged by a tool that is configured to rotate the rotatable lock latch between an unlocked and a locked position.

According to the first aspect of the present disclosure, the accessory may be an elevated bed rail assembly including a rail attached to a bracket, wherein the bracket is configured for receipt within the stake pocket, and the locking mechanism is configured to secure the bracket to the second aperture of the stake pocket.

According to the first aspect of the present disclosure, the accessory may be an anchor device that includes an anchor ring attached to a housing that is configured for receipt within the stake pocket, and the locking mechanism is configured to secure the housing to the stake pocket through the second aperture.

According to a second aspect of the present disclosure, an anchor device is provided that is configured for receipt in a stake pocket formed in a sidewall of a bed of a vehicle. The stake pocket includes an opening formed in an upper wall of the sidewall, a first aperture that is not accessible from the bed, and a second aperture that is accessible from the bed. According to the second aspect of the present disclosure, the anchor device may include a casing that is configured for receipt in the opening of the stake pocket, wherein the casing includes at least a third aperture, aligned with either the first aperture or the second aperture. In addition, the anchor device according to the second aspect of the present disclosure may include a locking mechanism that is movable between an unlocked and a locked position to secure the anchor device to either the first aperture or the second aperture.

The anchor device according to the second aspect of the present disclosure may include a D-ring that extends either away from the opening, or away from the second aperture toward an interior of the bed.

According to the second aspect of the present disclosure, the locking mechanism may be positioned within the casing, and may include a movable locking lever that is movable between a locked and an unlocked position, and in the locked position the lever is configured to engage the first aperture that is not accessible from the bed. In such a case, the movable locking lever may be moved by rotation of a locking cylinder located within the casing, or may be moved by rotation of a rod that is fixed to a depressible and rotatable button that is attached to the casing.

According to the second aspect of the present disclosure, the anchor device may be an elevated rail. In such a case, the casing may be an L-shaped tube having one end configured for receipt of the rail and another end configured to be received within the stake pocket, wherein the another end includes the third aperture that is aligned with the second aperture, and the locking mechanism is configured to secure the L-shaped tube to the second aperture. In this configuration, the locking mechanism may include a lock plate bezel that is configured to be received within the second aperture, and a rotatable lock latch having a pair of locking flanges that are configured to engage and secure the accessory to the third aperture formed in the L-shaped tube. In addition, the rotatable lock latch may include a recess that is configured to be engaged by a tool that is configured to rotate the rotatable lock latch between an unlocked and a locked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
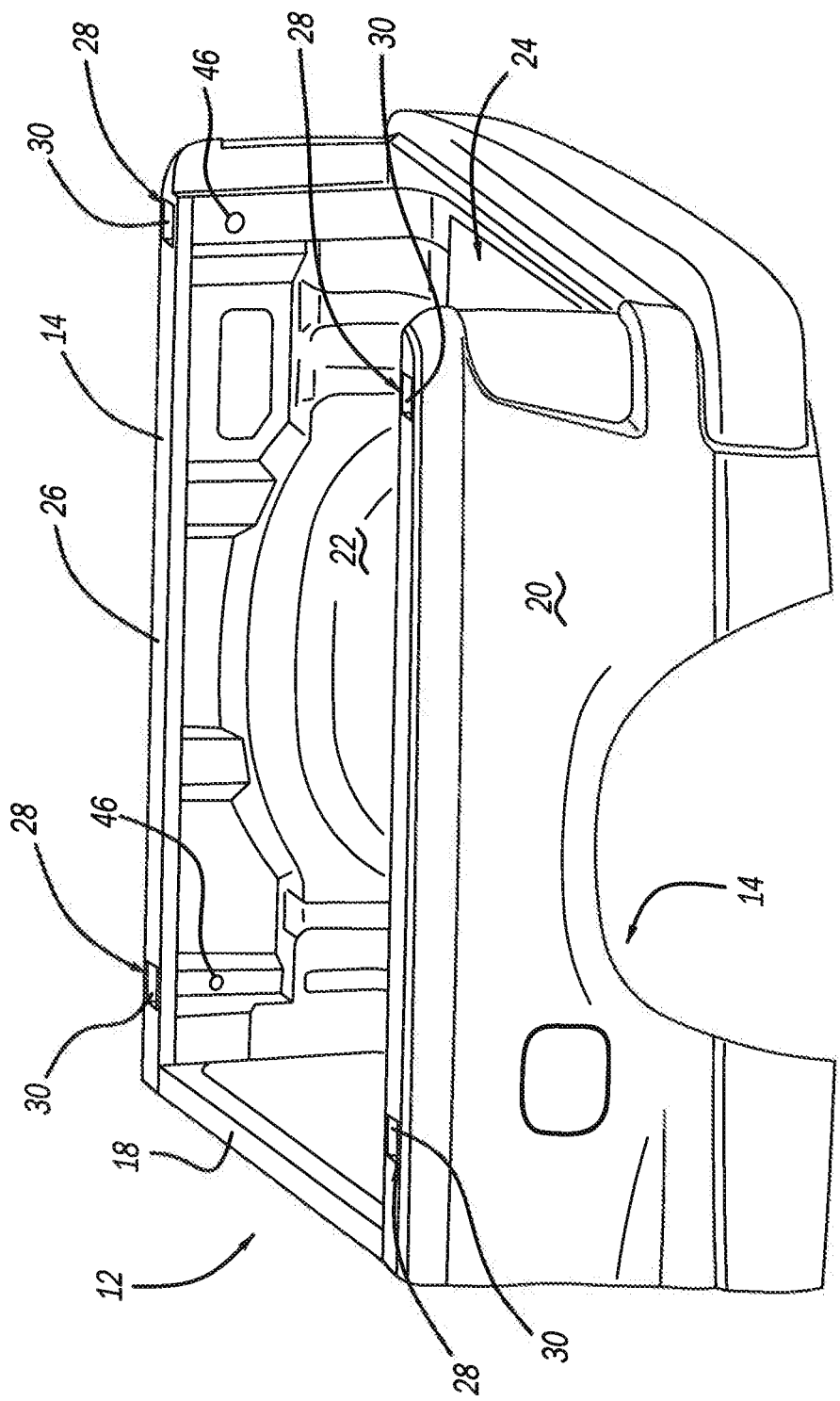
FIG. 1 is a perspective view of a bed of a pickup truck having a plurality of stake pockets.

FIG. 1 illustrates a bed 12 of a pickup truck. Bed 12 includes a pair of sidewalls 14 and a front wall 18. Sidewalls 14 include an exterior sidewall 20, an interior sidewall 22 that faces an interior 24 of the bed 12, and an upper sidewall 26 that connects exterior sidewall 20 and interior sidewall 22. Stake pockets 28 are formed in upper walls 26 at locations proximate tailgate (not shown) and front wall 18. Stake pockets 28 each include an opening 30 formed in upper wall 26 of sidewall 14. It should be understood, however, that additional stake pockets 28 may be formed in upper walls 26 at any number of locations between tailgate (not shown) and front wall 18.

Figure 2:
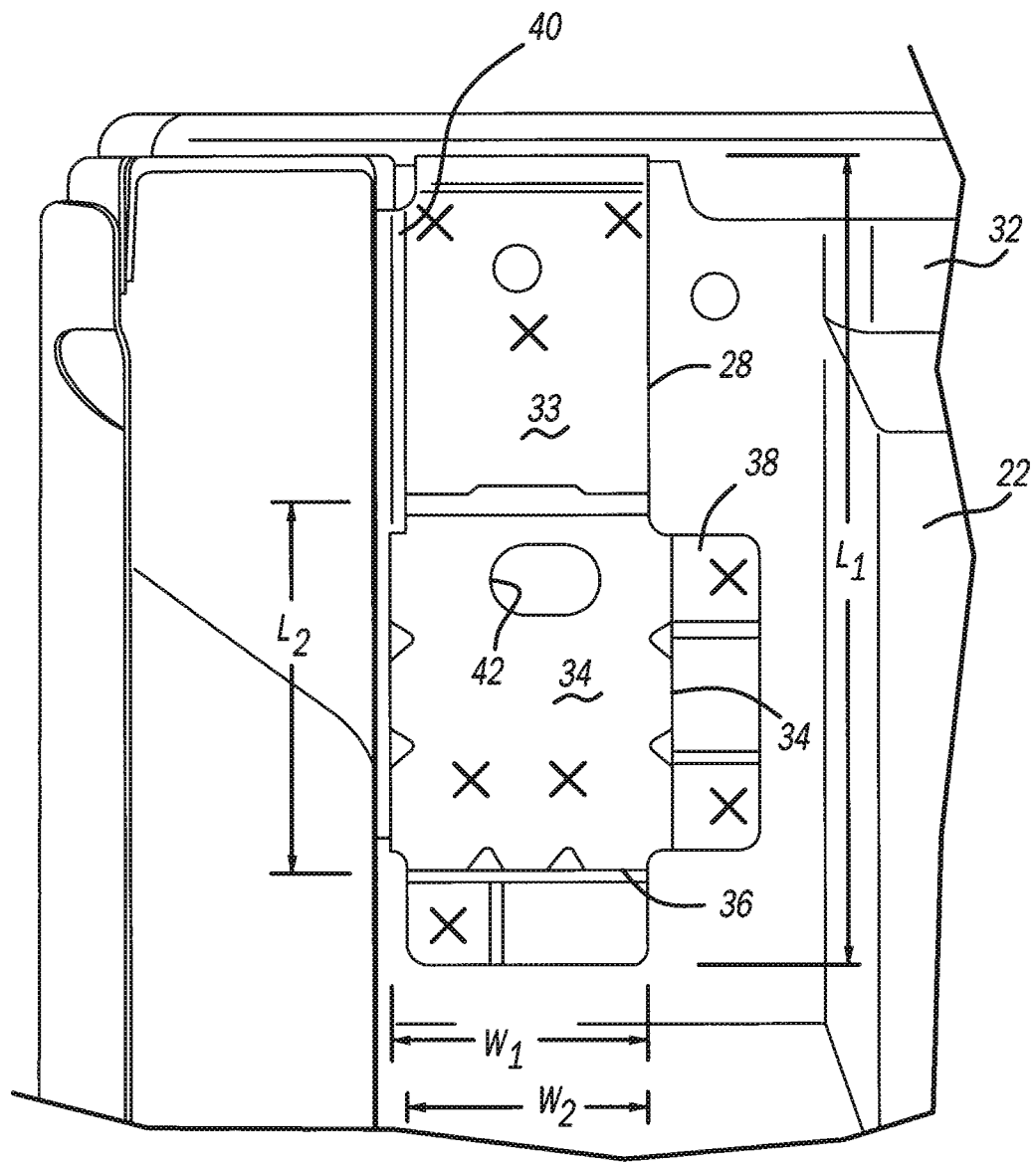
FIG. 2 is a perspective view of a stake pocket located within a sidewall of the bed, with an exterior panel of the sidewall removed.

An example stake pocket 28 is illustrated in FIG. 2, with exterior sidewall 20 of bed 12 being removed. In the illustrated embodiment, stake pockets 28 are monolithic members formed separately from exterior and interior sidewalls 20 and 22, with the exception of opening 30 formed in upper wall 26 of sidewall 14. Stake pockets 28 are generally formed from steel or some other type of metal material so that stake pockets 28 are rigid members, and are fixed to a surface 32 of interior sidewall 22 that faces exterior sidewall 20 by a fastener, such as a screw or by welding, at a location that corresponds to openings 30 formed in upper wall 26. Alternatively, stake pockets 28 can be fixed to a surface (not shown) of exterior sidewall 20 that faces surface 32 of interior sidewall 22, or stake pockets 28 may be formed by portions of the sheet metal that form exterior sidewall 20 and interior sidewall 22, respectively, of sidewalls 14.

Figure 3:
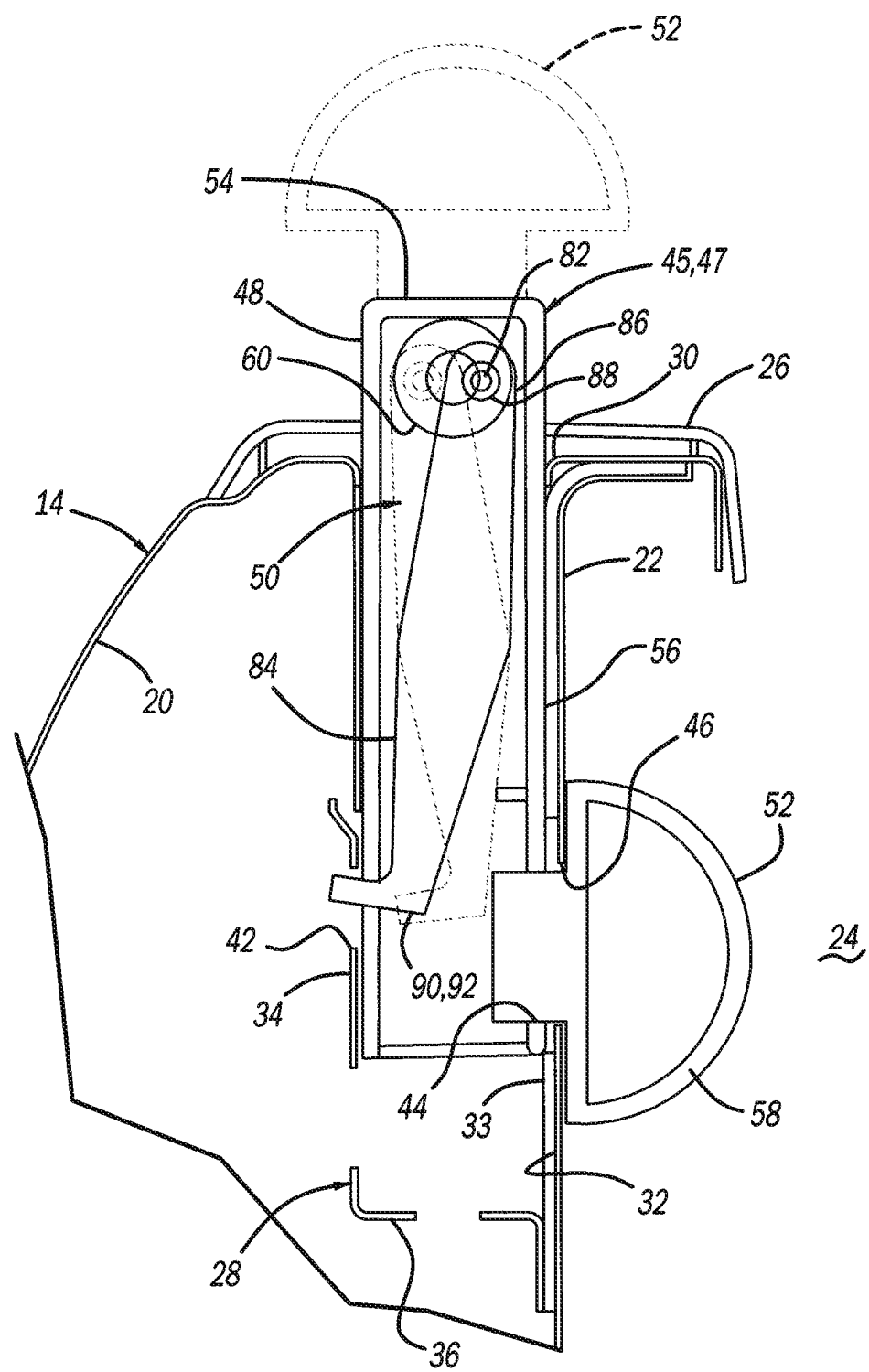
FIG. 3 is a cross-sectional perspective view of an accessory having a locking mechanism mounted within the stake pocket illustrated in FIG. 2.

Stake pockets 28 include a primary surface 33 that is fixed to surface 32 of interior sidewall 22. Primary surface 33 includes a length L1 and a width W1, which may be selected as desired. In general, length L1 is in the range of 5 to 10 inches and width W is in the range of 2 to 4 inches. Stake pockets 28 also include a plurality of side surfaces 34, and a bottom surface 36. Side surfaces 34 have a length L2 that is less than L1 and a width W2 that is about equal to W1. A first flange 38 extends outward from one of the side surfaces 34 that is configured to be fixed to surface 32 of interior sidewall 22. Although not required, a second flange 40 may extend orthogonal to primary surface 33 that may overlap with one of the side surfaces 34. One of the side surfaces 34 includes at least one first aperture 42 formed therein that faces exterior sidewall 20. Because first aperture 42 faces exterior sidewall 20, first aperture 42 is not accessible from interior 24 of bed 12. Primary surface 33 includes a second aperture 44 formed therein that is aligned with a through-hole 46 formed in interior sidewall 22, which is illustrated in FIG. 3. Second aperture 44, therefore, is accessible from interior 24 of bed 12 through through-hole 46.

As shown in FIG. 3, stake pocket 28 is configured for receipt of an accessory 45, which, in the illustrated embodiment, is configured as a removable anchor assembly 47. Anchor assembly 47 includes a casing 48 that houses a locking mechanism 50, and an anchor device 52 attached to the casing 48 at least one of an upper surface 54 of casing 48 and at a side surface 56 of casing 48 that is aligned with second aperture 44. In the illustrated embodiment, anchor device 52 is a D-ring 58. When anchor device 52 is attached to upper surface 54 of casing (shown in phantom in FIG. 3), anchor device 52 extends away from upper wall 26. When anchor device 52 is attached to side surface 56 of casing 48 that is aligned with second aperture 44, the anchor device 52 extends away from interior sidewall 22 toward interior 24 of bed 12. In either case, anchor device 52 allows for cargo to be secured within bed 12.

Casing 48 may be formed of a rigid material such as metal, reinforced plastic, or any other material that is rigid and durable. Example metal materials include steel, aluminum, and titanium, and example reinforced plastic materials include polyamide (e.g., Nylon®), without limitation so long as the material is rigid and durable. Anchor device 52 may be formed of materials such as steel, aluminum, and titanium in order to withstand forces exerted on anchor device 52 when being used to secure cargo within bed 12.

According to the present disclosure, accessory 45 includes locking mechanism 50 so that accessory 45 can be easily removed from stake pocket 28 when accessory 45 is not in use, while being prevented from being removed from stake pocket 28 when being used to secure cargo or when accessory is not in use (e.g., prevented from being stolen). Locking mechanism 50 includes a lock cylinder 60 that is rotatable between a locked position and unlocked position. To rotate lock cylinder 60, lock cylinder 60 may be engaged with a key (not shown). A portion of lock cylinder 60, therefore, is accessible through a through-hole 62 formed in casing 48, as best shown in FIG. 4.

Figure 4:
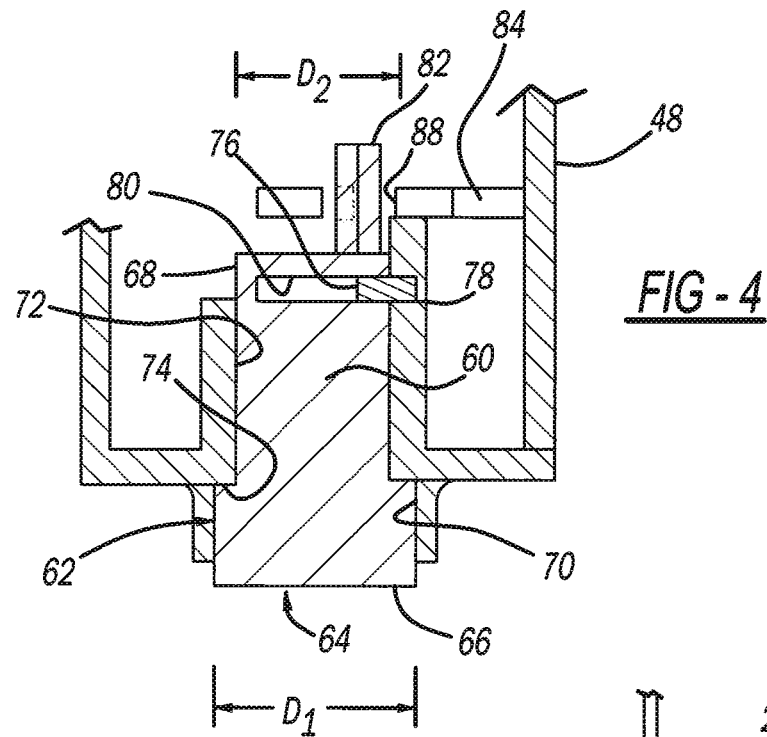
FIG. 4 is a cross-sectional view of a lock cylinder of the locking mechanism illustrated in FIG. 3.

More particularly, referring to FIG. 4, lock cylinder 60 is a cylindrical-shaped member 64 having a first end 66 with a first diameter D1 and a second end 68 having a second diameter D2, where D2 is less than D1. Lock cylinder 60 is inserted into through-hole 62, which is defined by first cylindrical bore 70 that extends outward from casing 48 having an inner diameter that is about equal to first diameter D1, and a second cylindrical bore 72 that extends into casing 48, having an inner diameter that is about equal to second diameter D2. Because first cylindrical bore 70 has an inner diameter that is greater than the inner diameter of second cylindrical bore 72, a shoulder 74 is formed between first cylindrical bore 70 and second cylindrical bore 72 that acts as a seat for first end 66 of lock cylinder 60. To retain lock cylinder 60 within first and second cylindrical bores 70 and 72, a radially inwardly extending retainer 76 is formed at a terminal end 78 of second cylindrical bore 72 that mates with a radially inwardly extending slot 80 formed in second end 68 of lock cylinder 60. To mate retainer 76 with slot 80, lock cylinder 60 is inserted into through-hole 62 in a first orientation and then rotated to mate retainer 76 with slot 80.

Lock cylinder 60 includes a prong 82 at second end 68 that extends outward from second end 68. Prong 82 is designed to mate with a lever 84 that is movable between a locked position and an unlocked position. In this regard, lever 84 includes a proximal end 86 (see FIG. 3) having an aperture 88 attached to prong 82 and a distal end 90 that defines a hook 92 that is configured to mate with first aperture 42 of stake pocket 28 that is not accessible from interior 24 of bed 12. When a key (not shown) is inserted into lock cylinder 60 and rotated to lock casing 48 to stake pocket 28, lock cylinder 60 and prong 82 will rotate along with the key. As prong 82 is rotated, the lever 84 will be moved such that hook 92 can be engaged with first aperture 42. When hook 92 is engaged with first aperture 42, casing 48 is prevented from being removable from stake pocket 28.

As noted above, anchor device 52 may be attached to the casing 48 at at least one of upper surface 54 of casing 48 and at side surface 56 of casing 48 that is aligned with second aperture 44. When anchor device 52 is attached at upper surface 54 of casing 48, anchor device 52 may be permanently attached to upper surface 54 by welding, brazing, fastener(s), or some other attachment method known to one skilled in the art because anchor device 52 will not affect locating casing 48 within stake pocket 28. Conversely, when anchor device 52 is attached to side surface 56 through second aperture 44, anchor device 52 must first be inserted through second aperture 44 and then mated with casing 48 as casing 48 is inserted into stake pocket 28.

Figure 5:
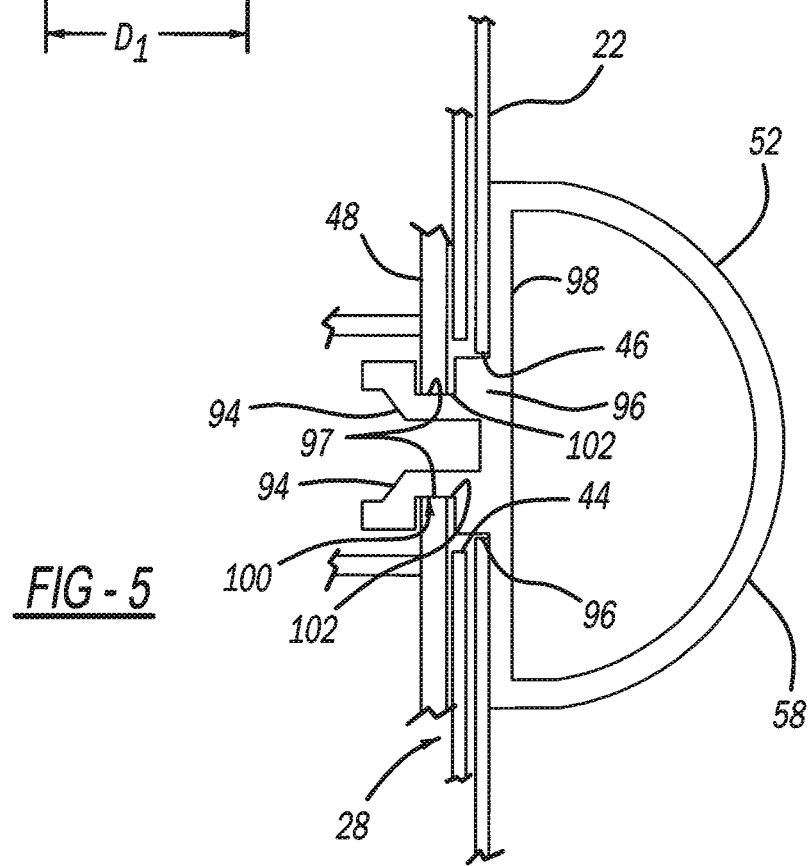
FIG. 5 is a cross-sectional view perspective view of an anchor device that is part of the accessory illustrated in FIG. 3.
Figure 6:
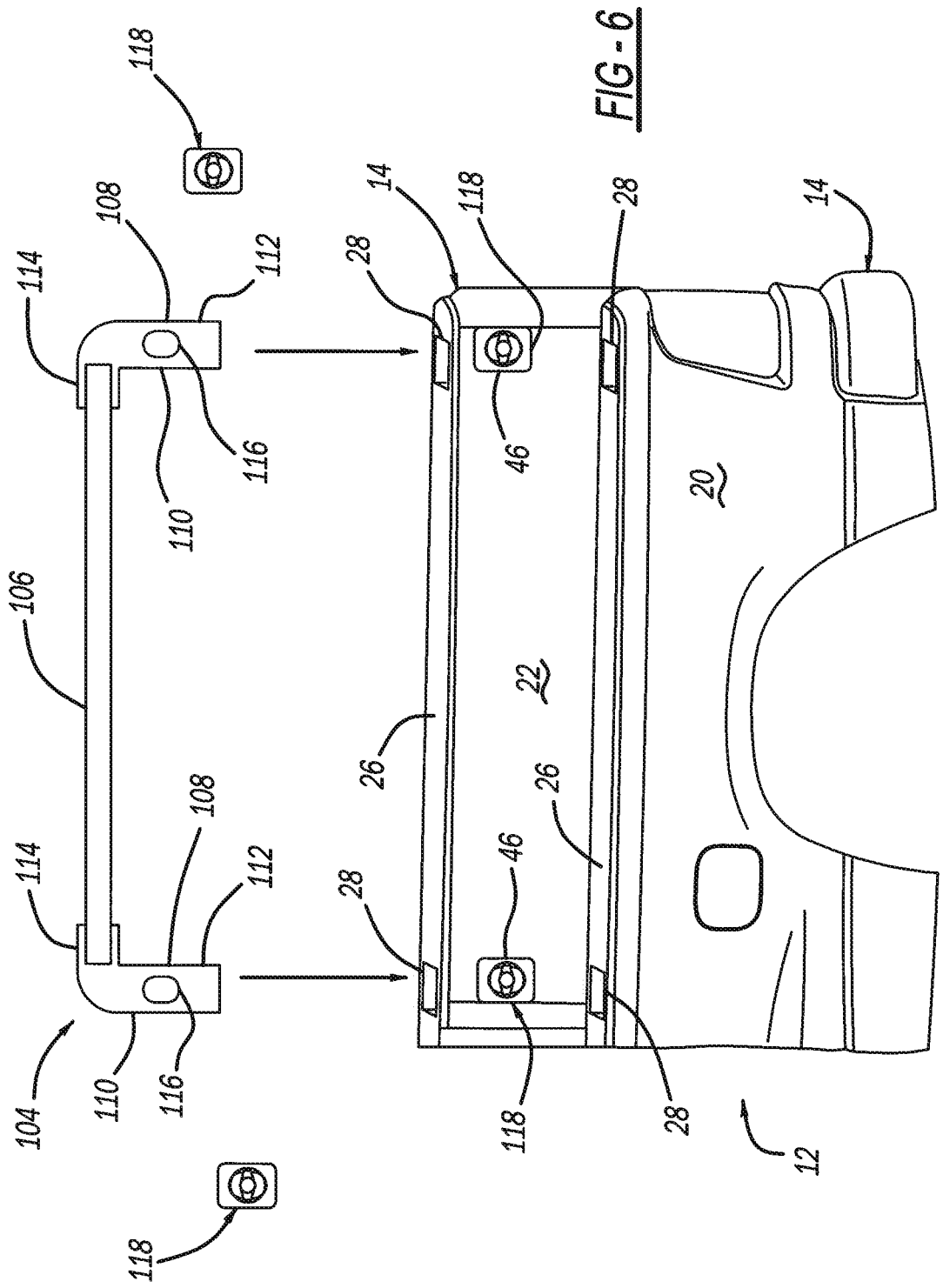
FIG. 6 is an exploded perspective view of an elevated rail system that is configured to be mounted within stake pockets of a bed of a pickup truck.

As best shown in FIG. 5, anchor device 52, which in the illustrated embodiment is a D-ring 58, includes a pair of ears 94 extending outward from a boss 96 that is integral or unitary with a base 98 of D-ring 58. Boss 96 has a diameter that corresponds to a diameter of second aperture 44 and through-hole 46 such that boss 96 mates D-ring 58 to through hole 46 and second aperture 44. Ears 94 are spaced apart from each other, and include a recess 97 that is configured to mate with an elongated slot 100 formed in casing 48. In this regard, once ears 94 of D-ring 58 are inserted into through hole 46 and second aperture 44, and boss 96 is mated with each, casing 48 is inserted into stake pocket 28. As casing 48 is seated into stake pocket 28, edges 102 of elongated slot 100 will mate with recesses 97 of ears 94 to secure D-ring 58 to casing 48, and prevent D-ring 58 from being disengaged from second aperture 44. Then, locking mechanism 50 can be actuated to engage hook 92 with first aperture 42 such that casing 48 and D-ring 58 are fixed to stake pocket 28.

Now referring to FIGS. 6 to 9, a second embodiment of the present disclosure is illustrated. In the illustrated embodiment, an elevated bed rail assembly 104 is configured to mate with a pair of stake pockets 28 of the bed 12 of a pickup truck 10. Elevated bed rail assembly 104 includes a rail 106 having casings or brackets 108 attached to opposing ends thereof, with brackets 108 being configured to mate with stake pockets 28. Brackets 108 are L-shaped tubes 110 having an elongated end 112 configured to be received within stake pockets 28, and an attachment end 114 configured to be secured to one of the ends of the rail 106. Elongated end 112 of bracket 108 includes an aperture 116 that, when elongated end 112 is mated with stake pocket 28, is aligned with second aperture 44 formed in stake pocket 28 and through-hole 46 of interior sidewall 22.

Figure 7:
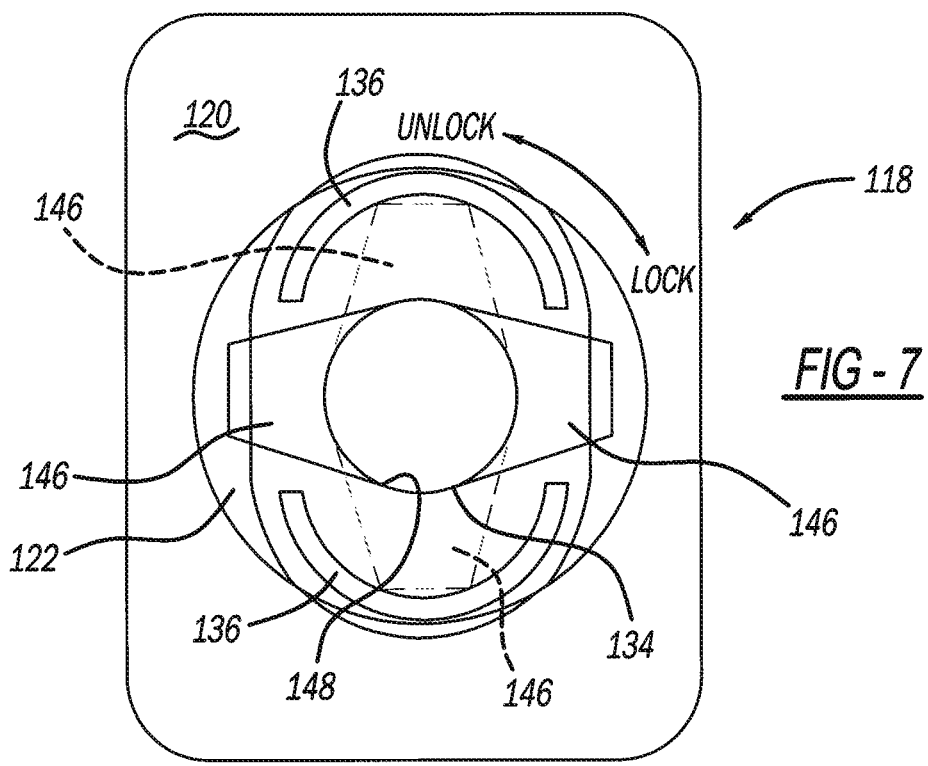
FIG. 7 is a perspective view of a locking device that is configured to secure the elevated rail system to the stake pockets of the bed of the pickup truck.
Figure 8:
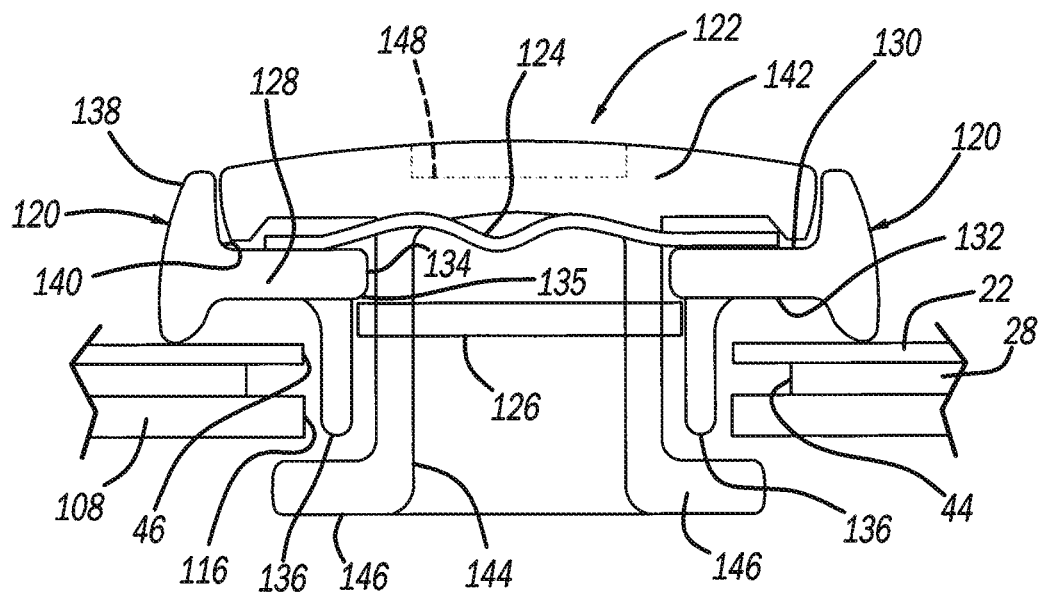
FIG. 8 is a cross-sectional perspective view of the locking device illustrated in FIG. 7, when attached to the stake picket of the bed of the pickup truck.
Figure 9:
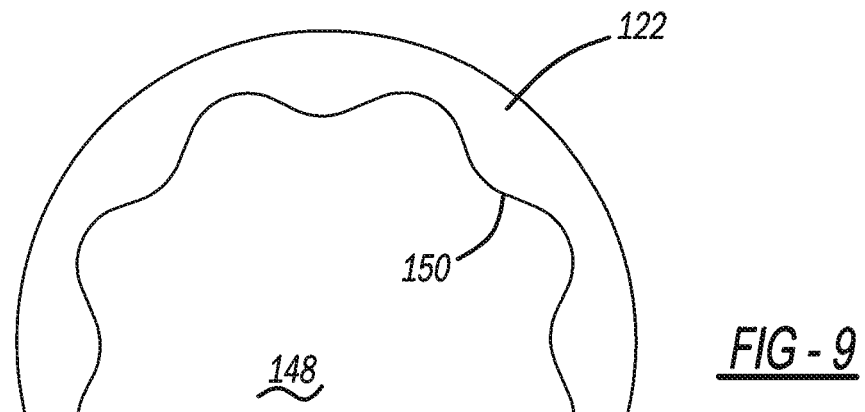
FIG. 9 is a perspective view of an example central recess that may be engaged with a tool to position the locking device illustrated in FIGS. 7 and 8 between an unlocked and a locked position.

After mating elongated ends 112 of brackets 108 within stake pockets 28 such that apertures 116 align with second apertures 44 of stake pocket 28 and through-holes 46 formed in interior sidewall 22 of bed 12, elevated rail assembly 104 can be secured to the bed 12 using a locking device 118. As best shown in FIGS. 7 and 8, locking device 118 includes a lock plate bezel 120, a lock latch 122, a wave washer 124, and a lock ring 126. Lock plate bezel 120 includes a main body 128 having a first major surface 130 and an opposite second major surface 132. Lock plate bezel 120 also includes a central through-hole 134 that is configured for receipt of lock latch 122. A pair of semi-circular shaped locating ribs 136 extend outward from second major surface 132 at a location positioned radially outward from central through-hole 134 such that a shoulder 135 is defined between locating ribs 136 and central through-hole 134. Locating ribs 136 are configured for locating lock plate bezel 120 within second aperture 44 of stake pocket 28, aperture 116 of bracket 108, and through-hole 46 of interior sidewall 22 of bed 12. In addition, lock plate bezel 120 includes a collar 138 extending about a periphery of main body 128 such that the combination of collar 138 and first major surface 130 of main body 128 define a seat 140 for lock latch 122.

Lock latch 122 includes a body portion 142 that sits within seat 140, with wave washer 124 located between body portion 142 and seat 140. Wave washer 124 encircles a cylindrical tube 144 that extends outward from body portion 142 through central through-hole 134 of lock plate bezel 120. A pair of locking flanges 146 extend radially outward from cylindrical tube 144 that, when lock latch 122 is rotated between an unlocked and a locked position, will secure lock latch 122 to both lock plate bezel 120 and bracket 108. To ensure that lock latch 122 and lock plate bezel 120 are secured to one another, lock ring 126 is fit about cylindrical tube 144 between locator ribs 136 that will abut shoulder 135.

Body portion 142 of lock latch 122 includes a central recess 148 having a distinct contour 150 (FIG. 9) for receipt of a tool (not shown) that is configured to rotate lock latch 122 between the locked and unlocked positions. In the illustrated embodiment, contour 150 is a wavy star shape. It should be understood, however, that contour 150 can be any designed selected by one skilled in the art. Notwithstanding, it is preferable that contour 150 is different from that generally available (e.g., a hexagonal shape) such that only the owner of the vehicle can lock and unlock the accessory (e.g., the elevated bed rail assembly 104) from the stake pocket 28.

As noted above, elevated bed rail assembly 104 is first mated with the stake pockets 28 by inserting brackets 108 into stake pockets 28 such that apertures 116 of brackets 108 are aligned with second aperture 44 formed in stake pocket 28 and through-hole 46 of interior sidewall 22. Then, locking device 118 is inserted into through-hole 46, second aperture 44, and aperture 116 of brackets 108 using locator ribs 136 as a guide. It should be understood that locking flanges 146 must be in the unlocked position during insertion of locking device 118. After locking device 118 is correctly inserted into second aperture 44 and apertures 116 of brackets 108, the special tool (not illustrated) is engaged with central recess 148 and rotated clockwise ninety degrees to secure locking flanges 146 to brackets 108. Elevated bed rail assembly 104 is now reliably secured to stake pockets 28.

Figure 10:
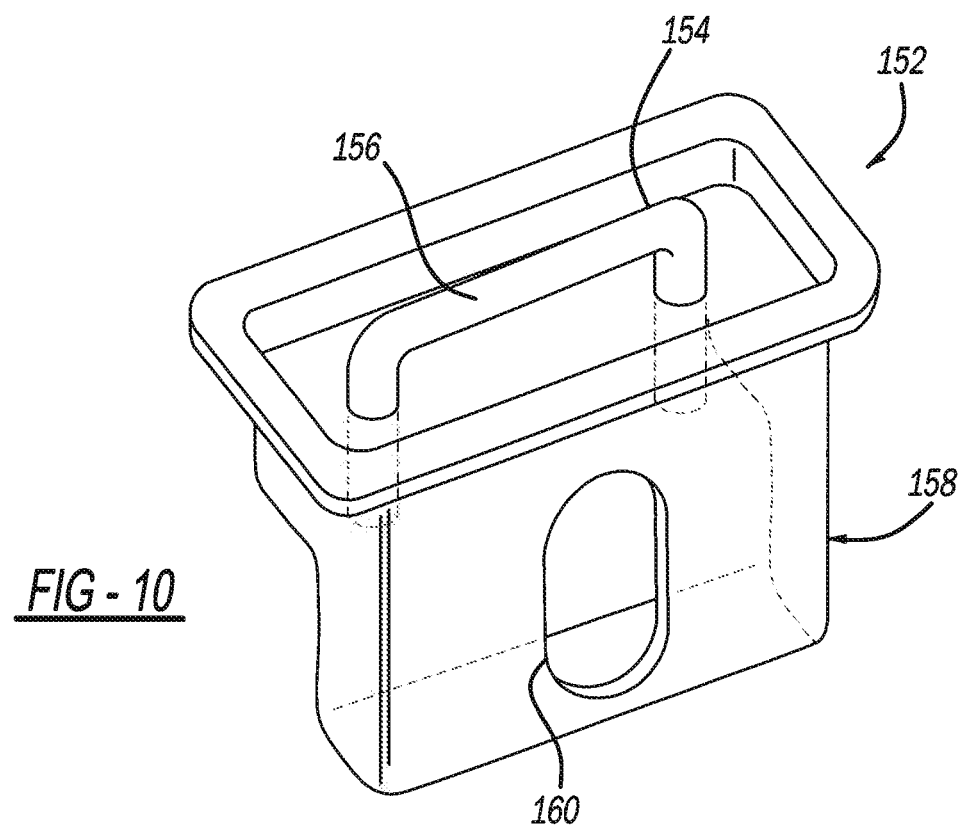
FIG. 10 is a perspective view of an example accessory that is configured to be secured to the stake pocket of the bed of the pickup truck using the locking device illustrated in FIGS. 7 and 8.

Although locking device 118 has been described as for use with elevated bed rail assembly 104, the present disclosure should not be limited thereto. In contrast, the above-described locking device 118 can also be used with other accessories that are designed to be mated with stake pocket 28. For example, referring to FIG. 10, an accessory 152, such as an anchor device 154, can be used in place of elevated bed rail assembly 104. Anchor device 154 includes an anchor ring 156 attached to a housing 158 that is configured for receipt within stake pocket 28. Housing 158 includes an aperture 160 that is similar to aperture 116 of brackets 108. After anchor device 154 is inserted into stake pocket 28, locking device 118 is mated with second aperture 44 and aperture 160 and locked in the manner described above. Anchor device 154, therefore, is reliably secured to stake pocket 28 and prevented from being removed from stake pocket 28 without being unlocked using the special tool (not illustrated).

Figure 11:
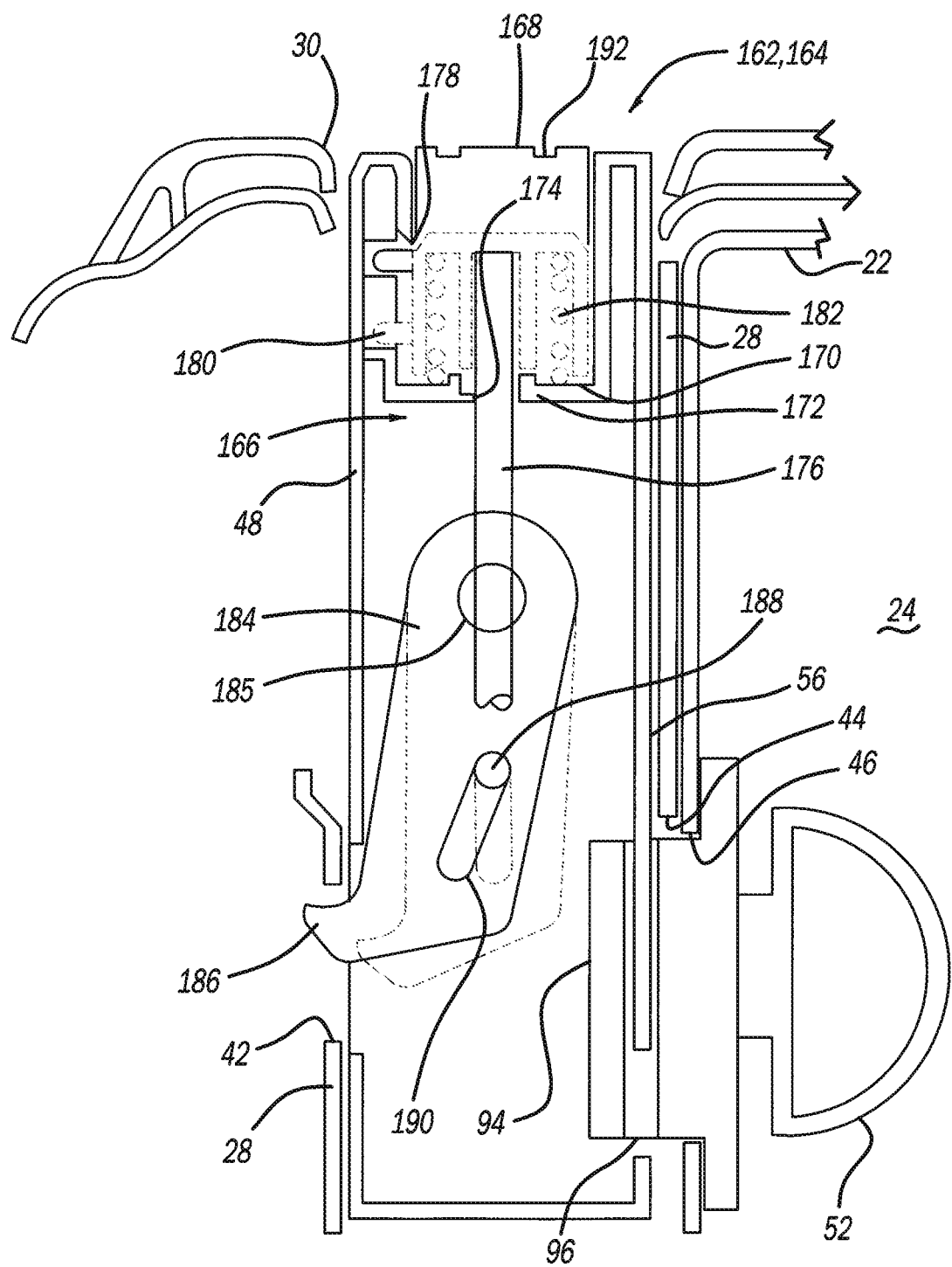
FIG. 11 is a cross-sectional perspective view of another accessory having a locking mechanism mounted within the stake pocket illustrated in FIG. 2.
Figure 12:
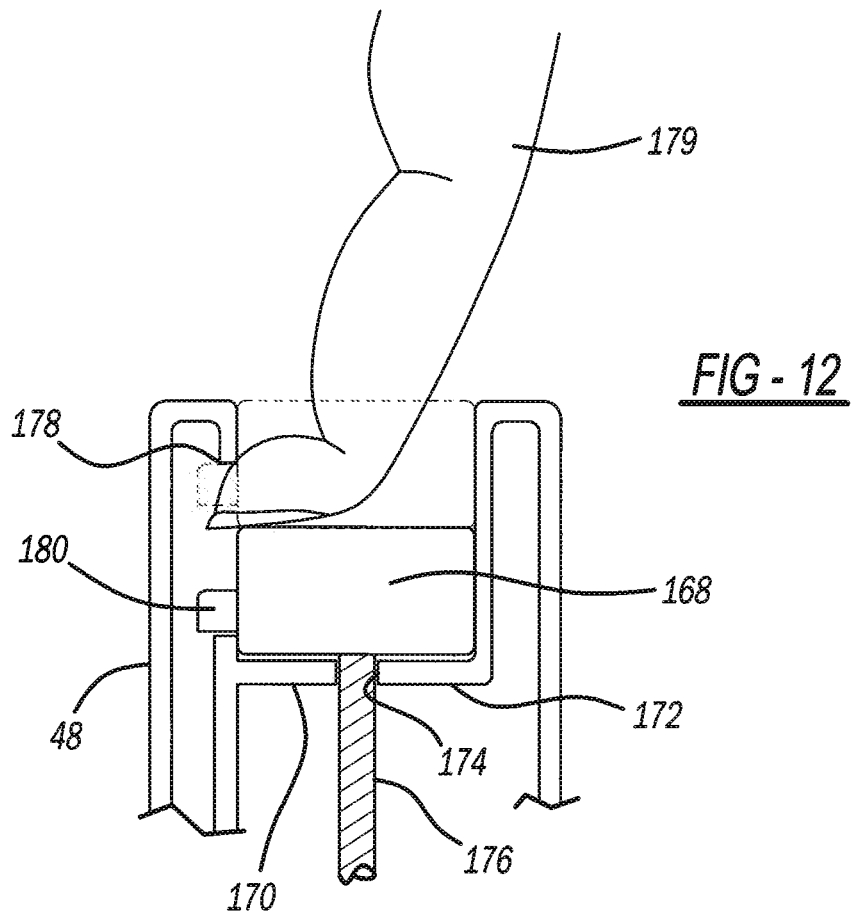
FIG. 12 is a partial cross-sectional view of the accessory illustrated in FIG. 11.
Figure 13:
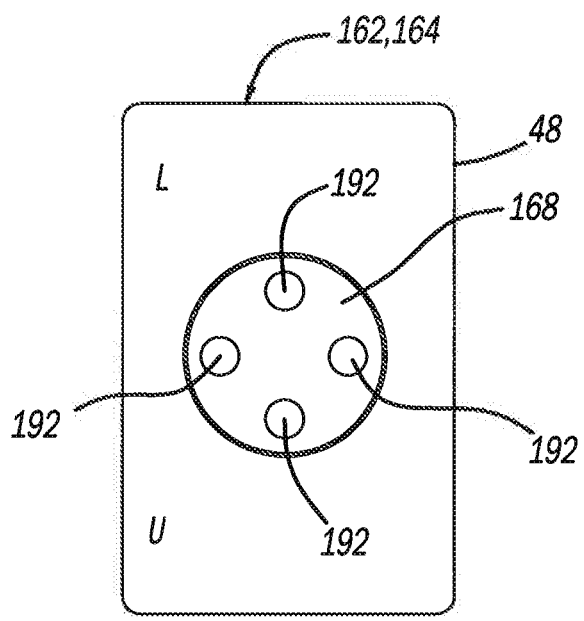
FIG. 13 is a top perspective view of the accessory illustrated in FIG. 11.
Figure 14:
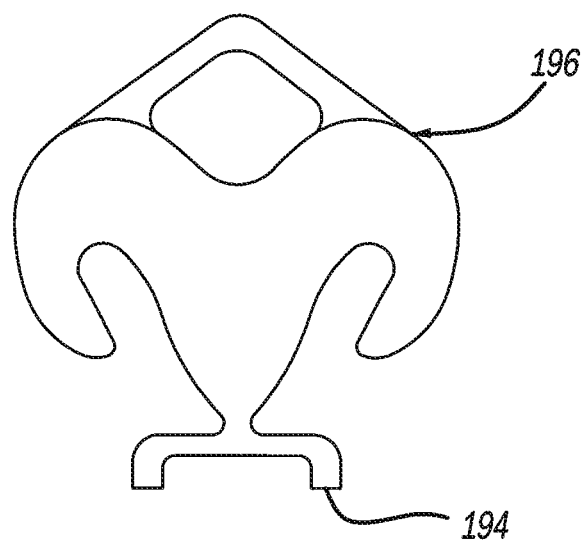
FIG. 14 is a perspective view of an example tool that may be used to actuate the locking mechanism illustrated in FIG. 11 between an unlocked and a locked position.

Now referring to FIGS. 11 to 13, an accessory 162 is illustrated that is configured as a removable anchor assembly 164. Anchor assembly 164 is similar to anchor assembly 47 described above, and includes casing 48 that houses a locking mechanism 166, and an anchor device 52 attached to the casing 48 at side surface 56 of casing 48 that is aligned with second aperture 44. In the illustrated embodiment, anchor device 52 is a D-ring 58 that extends away from interior sidewall 22 toward interior 24 of bed 12. In either case, anchor device 52 allows for cargo to be secured within bed 12.

Similar to the first embodiment, anchor device 52 is first inserted into through-hole 46 and second aperture 44, and then engaged by casing 48. In this regard, as best shown in FIG. 5, anchor device 52 includes a pair of ears 94 extending outward from a boss 96 that is integral or unitary with a base 98 of D-ring 58. Boss 96 has a diameter that corresponds to a diameter of second aperture 44 such that boss 96 mates D-ring 58 to second aperture 44. Ears 94 are spaced apart from each other, and include a recess 97 that is configured to mate with an elongated slot 100 formed in casing 48. In this regard, once ears 94 of D-ring 58 are inserted through second aperture 44 and boss 96 is mated with second aperture 44, casing 48 is inserted into stake pocket 28. As casing 48 is seated into stake pocket 28, edges 102 of elongated slot 100 will mate with recesses 97 of ears 94 to secure D-ring 58 to casing 48, and prevent D-ring 58 from being disengaged from second aperture 44. Then, locking mechanism 166 can be actuated such that casing 48 and D-ring 58 are fixed to stake pocket 28.

Locking mechanism 166 is different from locking mechanism 50 described in the first embodiment in that locking mechanism 166 does not include a lock cylinder 60. In contrast, locking mechanism 166 includes a depressible and rotatable cylindrical button 168. As best shown in FIG. 11, casing 48 includes a cylindrical socket 170 configured for receipt of button 168. Socket 170 has a depth that allows for button 168 to be depressed, as will be described in more detail below. A base 172 of socket 170 defines a central opening 174 that acts as a guide for a rod 176 of locking mechanism 166. In addition, socket 170 includes a shoulder 178 that is configured to engage with a radially outwardly extending flange 180 of button 168 when locking mechanism 166 is rotated into a locked position. In addition, shoulder 178 is configured to act as a gripping feature for removing casing 48 and locking mechanism 166 from stake pocket 28 when locking mechanism 166 rotated to an unlocked position and depressed. In this regard, upon rotation of button 168 to disengage flange 180 from shoulder and application of a downward force to button 168 to depress button 168 in socket 170, shoulder 178 will become exposed, which allows the owner of the vehicle to grip the shoulder 178 with a finger 179 and lift the casing 48 and locking mechanism 166 from stake pocket 28 (FIG. 12).

Button 168, when rotated to the locked position to align flange 180 with shoulder 178, is biased to abut shoulder 178 by a coil spring 182 seated between button 168 and base 172. Rod 176 is connected to one end thereof to button 168 in a manner that rod 176 will not rotate along with button 168 when button 168 is rotated between the locked and unlocked positions, but will move upward and downward along with button 168. An opposite end of rod 176 is attached to a lock lever 184 including a hook 186 that is actuatable between a locked and unlocked position. Lock lever 184 is rotatably coupled to casing 48 at pivot point 185, and rod 176 includes an arm 188 that extends orthogonally outward from rod 176 that is engaged with an angled slot 190 formed in lock lever 184. Lock lever 184, therefore, does not move upward and downward upon application or removal of a downward force on button 168. In contrast, as button 168 and rod 176 are moved upward and downward (i.e., between locked and unlocked positions), arm 188 is designed to move through angled slot 190 which will force hook 186 to move towards first aperture 42 formed in stake pocket 28 and lock casing 48 to stake pocket 28.

To rotate button 168 and rod 176, button 168 may include a plurality of depressions 192 that are designed to mate with prongs 194 of a special tool 196 that is designed to rotate button 168. Although the illustrated design includes depressions 192, it should be understood that button 168 can have a contoured recess like that illustrated in the second embodiment without departing from the scope of the present disclosure. Regardless, because accessory 162 is configured to be locked to stake pocket 28, accessory 162 is reliably secured to stake pocket 28, and is prevented from being removed by anyone except the owner of the vehicle that has tool 196.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An accessory configured to be secured within a stake pocket formed in a sidewall of a bed of a vehicle, the stake pocket including an opening formed in an upper wall of the sidewall configured for receipt of the accessory, a first aperture that is not accessible from the bed, and a second aperture that is accessible from the bed, the accessory comprising a locking mechanism configured to secure the accessory to the first aperture, wherein the locking mechanism includes a casing that houses a movable locking lever, the movable locking lever being movable between a locked position and an unlocked position, and in the locked position the movable locking lever is configured to engage the first aperture that is not accessible from the bed.

2. The accessory according to claim 1, wherein the accessory includes an anchor device that extends either away from the opening, or away from the second aperture toward an interior of the bed.

3. The accessory according to claim 2, wherein the anchor device is a D-ring.

4. The accessory according to claim 1, wherein the movable locking lever is moved by rotation of a locking cylinder located within the casing.

5. The accessory according to claim 1, wherein the movable locking lever is moved by rotation of a rod that is fixed to a depressible and rotatable button that is attached to the casing.

6. The accessory according to claim 1, wherein the locking mechanism secures the accessory to the second aperture of the stake pocket.

7. The accessory according to claim 6, wherein the locking mechanism includes a lock plate bezel that is configured to be received within the second aperture, and a rotatable lock latch having a pair of locking flanges that are configured to engage and secure the accessory to an interior of the stake pocket.

8. The accessory according to claim 7, wherein the rotatable lock latch includes a recess that is configured to be engaged by a tool that is configured to rotate the rotatable lock latch between an unlocked and a locked position.

9. The accessory according to claim 1, wherein the accessory is an elevated bed rail assembly including a rail attached to a bracket, the bracket being configured for receipt within the stake pocket, and the locking mechanism being configured to secure the bracket to the second aperture of the stake pocket.

10. The accessory according to claim 1, wherein the accessory is an anchor device that includes an anchor ring attached to a housing that is configured for receipt within the stake pocket, and the locking mechanism is configured to secure the housing to the stake pocket through the second aperture.

* * * * *